US008259237B2

United States Patent
Nishioka et al.

(10) Patent No.: US 8,259,237 B2
(45) Date of Patent: Sep. 4, 2012

(54) IMAGE DISPLAY APPARATUS AND IMAGE DISPLAY METHOD

(75) Inventors: Ken Nishioka, Daito (JP); Atsuya Hirano, Daito (JP); Kenji Nagashima, Daito (JP); Manabu Murayama, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 597 days.

(21) Appl. No.: 12/491,790

(22) Filed: Jun. 25, 2009

(65) Prior Publication Data
US 2010/0002152 A1 Jan. 7, 2010

(30) Foreign Application Priority Data

Jul. 2, 2008 (JP) .................................. 2008-173185

(51) Int. Cl.
*H04N 5/64* (2006.01)
(52) U.S. Cl. ........................................................ 348/744
(58) Field of Classification Search .................... 353/29, 353/30; 348/744
See application file for complete search history.

(56) References Cited

U.S. PATENT DOCUMENTS

| 7,419,266 | B2 * | 9/2008 | Seki ................................. 353/30 |
| 2006/0132472 | A1 | 6/2006 | Peeters et al. | |
| 2006/0255243 | A1 | 11/2006 | Kobayashi et al. | |

FOREIGN PATENT DOCUMENTS

| EP | 1275998 A1 | 1/2003 |
| EP | 2 144 447 A1 | 1/2010 |
| JP | 2003-270563 | 9/2003 |
| JP | 2006-323035 | 11/2006 |
| JP | 2007-065012 A | 3/2007 |
| JP | 2007-147728 | 6/2007 |
| JP | 2007-193337 | 8/2007 |

OTHER PUBLICATIONS

Extended European Search Report for Application No. 09163695.1 mailed Jun. 9, 2011 (9 pages).
espacenet, Patent Abstract for Japanese Publication No. 2007-065012 Publication date Mar. 15, 2007 (1 page).
Patent Abstracts of Japan for Japanese Publication No. 2007-147728, Publication date Jun. 14, 2007 (1 page).
Patent Abstracts of Japan for Japanese Publication No. 2006-323035, Publication date Nov. 30, 2006 (1 page).
Patent Abstracts of Japan for Japanese Publication No. 2003-270563, Publication date Sep. 25, 2003 (1 page).
Patent Abstracts of Japan for Japanese Publication No. 2007-193337, Publication date Aug. 2, 2007 (1 page).

* cited by examiner

*Primary Examiner* — Hunter B Lonsberry
(74) *Attorney, Agent, or Firm* — Osha Liang LLP (57) ABSTRACT

A detection surface of an optical detector is divided into regions C, E, F, G, and H. The optical detector outputs detection signals corresponding to the amounts of light incident on the respective regions. A position detection controller calculates an image projection position based on timing at which a laser beam is incident on region C. A laser control circuit adjusts the intensity of the laser beam emitted by a laser based on laser beam intensities detected in regions E to H arranged around region C.

16 Claims, 7 Drawing Sheets

IMAGE DISPLAY APPARATUS AND IMAGE DISPLAY METHOD

BACKGROUND OF THE INVENTION

1. Field of the Invention

The present invention relates to an image display apparatus and an image display method for displaying an image by projecting light onto a projection surface. Particularly, the present invention relates to an image display apparatus and an image display method for displaying an image by projecting a laser beam onto a projection surface.

2. Description of the Background Art

In recent years, development of laser projectors for displaying an image by projecting a laser beam onto a projection surface such as a screen has advanced. To display an image appropriately with a laser projector, it is important to detect the intensity of a laser beam emitted by a laser and the position of a scanning element scanning the laser beam on a projection surface, and to determine scanning timing.

Patent Document 1 (Japanese Patent Laying-Open No. 2007-147728) discloses an image display apparatus including an optical detector that obtains a signal for detecting the amount of light emitted by a laser and also obtains a signal for detecting the position of a holder holding a lens and a polarizing plate.

Further, an image display apparatus disclosed in Patent Document 2 (Japanese Patent Laying-Open No. 2006-323035) includes a linear detector detecting the position of light emitted from a light source for detecting a mirror angle and reflected by a scanning mirror. The image display apparatus controls driving of the scanning mirror based on a detection signal of the linear detector.

Patent Document 3 (Japanese Patent Laying-Open No. 2003-270563) discloses an image display apparatus including a light source outputting synchronization detection light provided independently of a light source outputting a scanning light beam eventually projected onto a screen, and a light receiving unit detecting the synchronization detection light. An output signal output from the light receiving unit is converted into a synchronization signal. Further, the synchronization signal is converted into a scanning start signal.

An image display apparatus disclosed in Patent Document 4 (Japanese Patent Laying-Open No. 2007-193337) includes an optical sensor sensing the amount of off-light not used for image display. The image display apparatus corrects optical output of a light source in accordance with a sensing result of the optical sensor.

SUMMARY OF THE INVENTION

The intensity characteristic of a laser beam output by a laser projector relative to a drive current varies with changes in temperature. Further, the scanning range of a laser beam varies depending on apparatuses, resulting from assembly of an optical system in a laser projector and the like. Therefore, to allow an appropriate image to be displayed, it is preferable to provide a laser projector with a laser beam intensity detector as disclosed in Patent Document 1 or Patent Document 4 and a laser beam position detector as disclosed in Patent Document 2 or Patent Document 3 in order to control both the intensity of a laser beam and the scanning range of the laser beam.

Conventionally, these detectors have been arranged separately in a laser projector. This has led to an increase in the number of parts, and thus an increase in man-hours for adjusting parts as well as an increase in cost.

The present invention has been made to solve a problem as described above. One object of the present invention is to provide an image display apparatus capable of detecting the intensity and the position of a laser beam, and having less parts.

According to one aspect of the present invention, an image display apparatus for displaying an image on a projection surface by applying a laser beam onto the projection surface is provided. The image display apparatus includes a laser light source for emitting the laser beam in accordance with a drive current, and a scanning device for conducting the laser beam scan by applying the laser beam to a prescribed range on the projection surface. The scanning device applies the laser beam selectively for each pixel of the image in a prescribed cycle. The image display apparatus further includes a beam splitting element for splitting the incident laser beam into a first laser beam directed toward the projection surface and a second laser beam directed toward a direction different from a direction toward the projection surface, and a detector having a detection surface for detecting the reflected laser beam. The detection surface includes a first region including therein a region in which the second laser beam is scanned as the first laser beam is scanned in a projection range of the image, and a second region which is arranged around the first region and on which the second laser beam is incident at prescribed timing by scanning of the laser beam by the scanning device. The image display apparatus further includes a position detector for detecting a position of the scanning device based on timing at which the laser light source is driven and timing at which the laser beam is incident on the first region, and a laser control unit for adjusting timing of emission of the laser beam based on the position of the scanning device and adjusting an intensity of the laser beam emitted by the laser light source based on an intensity of the laser beam detected in the second region.

Preferably, the first region is wider than the projection range by a range corresponding to an assembly error for the image display apparatus.

Preferably, the scanning device conducts the laser beam scan at a first frequency in a first direction, and conducts the laser beam scan at a second frequency lower than the first frequency in a second direction orthogonal to the first direction. The detector detects an intensity of the laser beam incident on a region deviated from the first region in the second direction.

More preferably, the second region includes two intensity detection regions arranged at different positions in the second direction. The laser control unit controls the laser light source to allow the laser beam with a different intensity to be incident on each of the intensity detection regions, determines a characteristic of the intensity of the laser beam emitted by the laser light source relative to the drive current based on a detection result on the intensity of the laser beam incident on each of the intensity detection regions, and adjusts the intensity of the laser beam emitted by the laser light source based on the characteristic.

Preferably, the laser light source emits a plurality of laser beams having colors different from one another. The laser control unit causes the laser light source to emit the laser beam having one of the colors in each period in which the laser beam is detected in the second region.

More preferably, the image display apparatus further includes an amplifier for amplifying a detection result on the laser beam of each color in the second region in accordance with detection sensitivity for the laser beam of each color, and outputting a signal to the laser control unit.

More preferably, the laser light source includes a two-color laser for emitting a red laser beam and a blue laser beam, and a green laser for emitting a green laser beam.

Preferably, the scanning device is a resonance scanning mirror oscillating in accordance with a drive signal. The image display apparatus further includes a driver for supplying the drive signal to the resonance scanning mirror. The second region is divided into two phase detection regions having a central axis of a scanning range of the laser beam as a boundary line. The image display apparatus further includes a phase detection unit for detecting a phase difference between a phase of oscillation of the resonance scanning mirror and a phase of the drive signal based on a period for which the laser beam is incident on each of the phase detection regions and timing at which the driver supplies the drive signal to the resonance scanning mirror.

According to another aspect of the present invention, an image display method for displaying an image on a projection surface by applying a laser beam from a laser light source onto the projection surface is provided. The laser beam is split into a first laser beam directed toward the projection surface and a second laser beam directed toward a direction different from a direction toward the projection surface. The image display method includes the steps of: detecting a scanning position of the laser beam based on timing at which the laser beam is incident on a first region including therein a region in which the second laser beam is scanned as the first laser beam applied selectively for each pixel of the image toward the projection surface is scanned in a projection range of the image, and timing at which the laser light source emits the laser beam; detecting an intensity of the laser beam incident on a second region arranged around the first region; adjusting timing of emission of the laser beam based on the scanning position; and adjusting an intensity of the laser beam emitted by the laser light source based on the intensity of the laser beam incident on the second region.

Preferably, the laser light source emits a plurality of laser beams having colors different from one another. The laser light source emits the laser beam having one of the colors in each period in which the laser beam is incident on the second region.

An image display apparatus in accordance with the present invention includes an optical detector having a detection surface divided into a detection surface for detecting an intensity and a detection surface for detecting a position. Therefore, the image display apparatus in accordance with the present invention can detect the intensity and the position of a laser beam, and has less parts.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings. In the description below, identical parts will be designated by the same reference numerals. Since their names and functions are also identical, the detailed description thereof will not be repeated.

[1. Overall Configuration of Apparatus]

Figure 1:
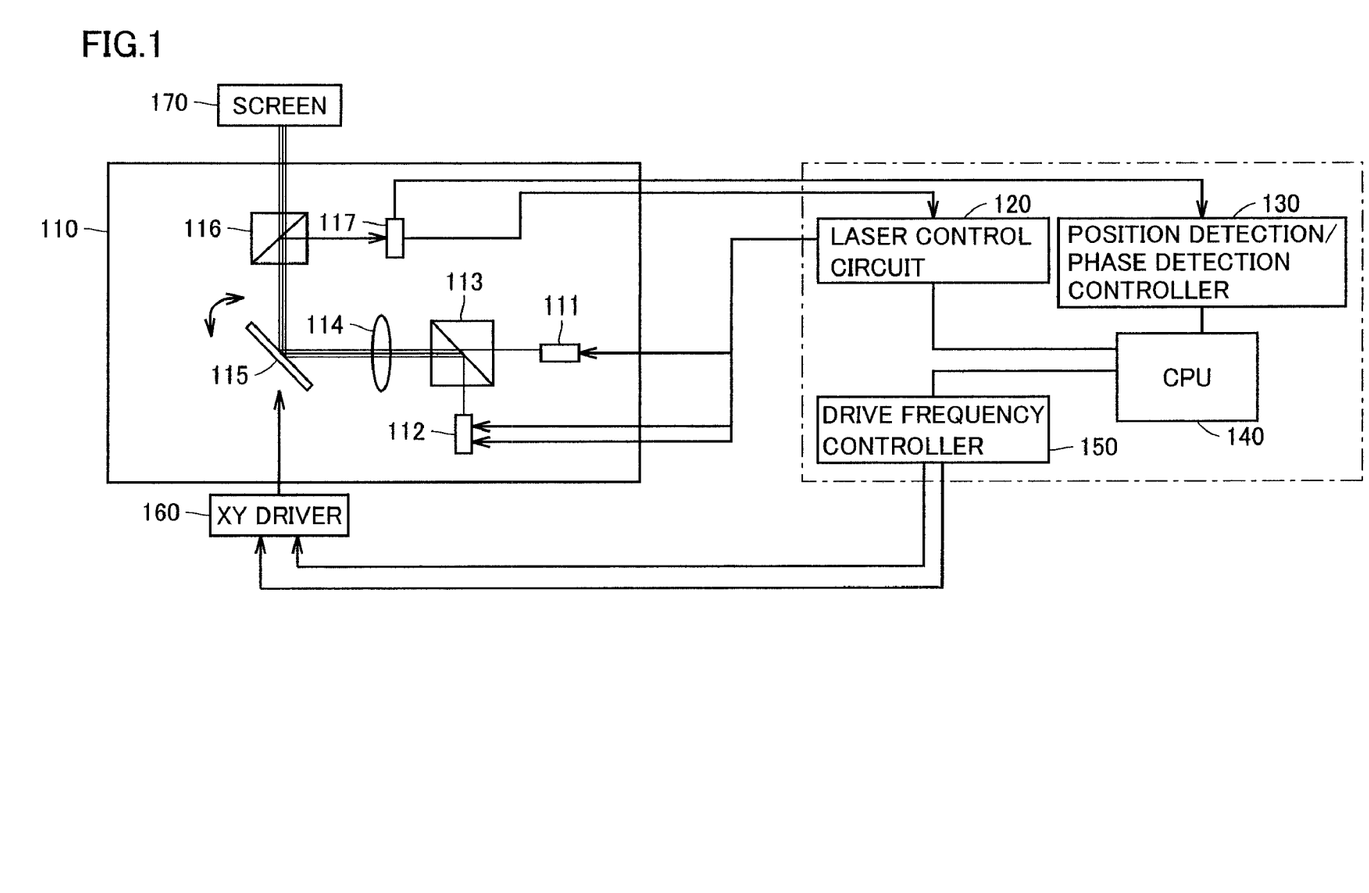
FIG. 1 is a block diagram showing a configuration of an image display apparatus in accordance with the present embodiment.

Referring to FIG. 1, a configuration of an image display apparatus 100 in accordance with the present embodiment will be described. FIG. 1 is a block diagram showing a configuration of image display apparatus 100 in accordance with the present embodiment.

Image display apparatus 100 is a so-called laser projector for displaying an image on a projection surface by applying a laser beam onto the projection surface. Image display apparatus 100 includes an optical system 110, a laser control circuit 120, a position detection/phase detection controller 130, a CPU (Central Processing Unit) 140, a drive frequency controller 150, and an XY driver 160.

Optical system 110 includes a green laser 111, a two-color laser 112, a first beam splitter 113, a collimator lens 114, a scan mirror 115, a second beam splitter 116, and an optical detector 117.

Green laser 111 emits a green laser beam. If a laser capable of oscillating a green laser beam is not available, a combination of a red laser emitting a red laser beam and an SHG (Second-Harmonic Generation) element may be used as green laser 111.

Two-color laser 112 emits a red laser beam and a blue laser beam. A red laser chip oscillating a red laser beam and a blue laser chip oscillating a blue laser beam are mounted in a package of two-color laser 112.

A red laser and a blue laser independent of each other may be used instead of two-color laser 112. In the present embodiment, however, two-color laser 112 is used, because the number of parts and the size of optical system 110 can be reduced by using two-color laser 112.

The first beam splitter 113 causes an optical path of the green laser beam and optical paths of the red laser beam and the blue laser beam to match with one another. In a case where the respective lasers and the first beam splitter 113 are arranged as shown in FIG. 1, the first beam splitter 113 transmits the green laser beam and reflects the red laser beam and the blue laser beam. It is to be noted that the first beam splitter 113 is an example of a combining element combining optical paths of laser beams. Another optical element may be used instead of the first beam splitter 113.

Collimator lens 114 collects the beams passing through the first beam splitter 113 and forms a parallel beam.

Scan mirror 115 receives a drive signal and conducts the laser beam scan, and thereby applies an image to be displayed onto a screen 170 selectively for each pixel. In the present embodiment, scan mirror 115 is a resonance scanning mirror. However, those other than a resonance scanning mirror, for example, a DMD (Digital Micromirror Device) and the like may be used as scan mirror 115.

The second beam splitter 116 reflects a portion of the laser beam scanned by scan mirror 115, and transmits the remaining laser beam. The transmitted laser beam is incident on screen 170. The reflected laser beam is incident on optical detector 117. Preferably, the second beam splitter 116 has a reflectivity that is as low as possible within a range in which the reflected beam can be detected by optical detector 117, in order to allow as much beam as possible to be projected onto screen 170.

Optical detector 117 detects the beam incident on a detection surface thereof. Optical detector 117 includes a power detection unit detecting the intensity of the laser beam, and a position detection unit detecting an image projection position. The detection surface of optical detector 117 is divided into a detection surface of the power detection unit and a detection surface of the position detection unit. A configuration of the detection surface of optical detector 117 will be described later in detail.

It is to be noted that the configuration of optical system 110 is not limited to the one described above. Optical system 110 may be any optical system including a plurality of optical elements arranged such that a scanned laser beam is projected onto a projection surface such as screen 170.

Laser control circuit 120 controls green laser 111 and two-color laser 112 based on a detection result in an intensity detection region.

Position detection/phase detection controller 130 includes a position detection controller 130a and a phase detection controller 130b not shown in FIG. 1. Position detection controller 130a detects the position of the laser beam based on a detection result on the laser beam in a position detection region. Phase detection controller 130b detects a phase difference between a phase of the drive signal supplied to scan mirror 115 and a phase of oscillation of scan mirror 115.

CPU 140 controls operations of laser control circuit 120, position detection/phase detection controller 130, and drive frequency controller 150. For example, CPU 140 transmits an image signal corresponding to the image to be displayed on screen 170 to laser control circuit 120. Further, CPU 140 supplies a position signal and a phase signal corresponding to a detection result of position detection/phase detection controller 130 to drive frequency controller 150.

Drive frequency controller 150 controls XY driver 160 based on the position signal and the phase signal. Specifically, drive frequency controller 150 causes XY driver 160 to output the drive signal corresponding to the position of the laser beam and the phase of scan mirror 115.

In image display apparatus 100 in accordance with the present embodiment, detection of the intensity of a laser beam and detection of the position of the laser beam can be performed by one optical detector 117. Therefore, image display apparatus 100 requires less parts than those in a conventional image display apparatus.

Figure 2:
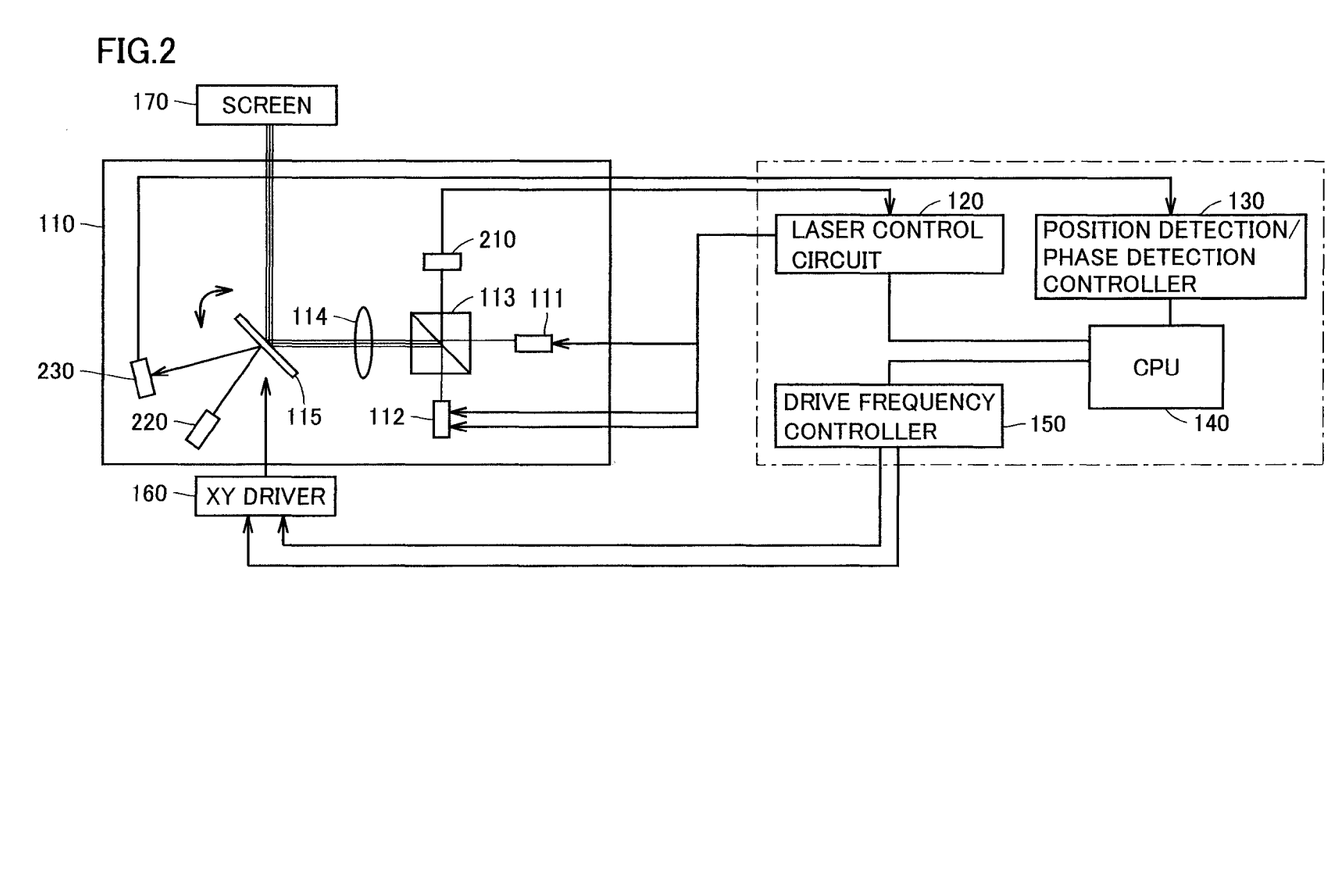
FIG. 2 is a block diagram showing an exemplary configuration of a conventional image display apparatus.

FIG. 2 shows a configuration of a conventional typical image display apparatus 100#, for comparison. FIG. 2 is a block diagram showing an exemplary configuration of conventional image display apparatus 100#.

Image display apparatus 100# is different from image display apparatus 100 in the configuration of the optical system. Specifically, an optical system 110# in image display apparatus 100# does not include optical detector 117. Instead, optical system 110# includes an intensity detector 210, a light source 220, and an optical detector 230 not included in optical system 110.

Intensity detector 210 detects the intensity of a laser beam passing a surface of the first beam splitter 113 not facing collimator lens 114. Laser control circuit 120 controls operations of green laser 111 and two-color laser 112 based on a detection result of intensity detector 210.

Light source 220 emits inspection light for detecting a scanning position toward scan mirror 115. Optical detector 230 detects the inspection light reflected by scan mirror 115. Position detection/phase detection controller 130 detects the position of scan mirror 115 based on a detection result of optical detector 230.

As described above, image display apparatus 100 in accordance with the present embodiment requires less parts than those in a conventional image display apparatus. Further, it also requires less man-hours for adjustment after assembly thereof than those required in a conventional image display apparatus. Therefore, fabrication cost can be suppressed when compared with that for a conventional image display apparatus.

[2. Configuration of Optical Detector]

Figure 3:
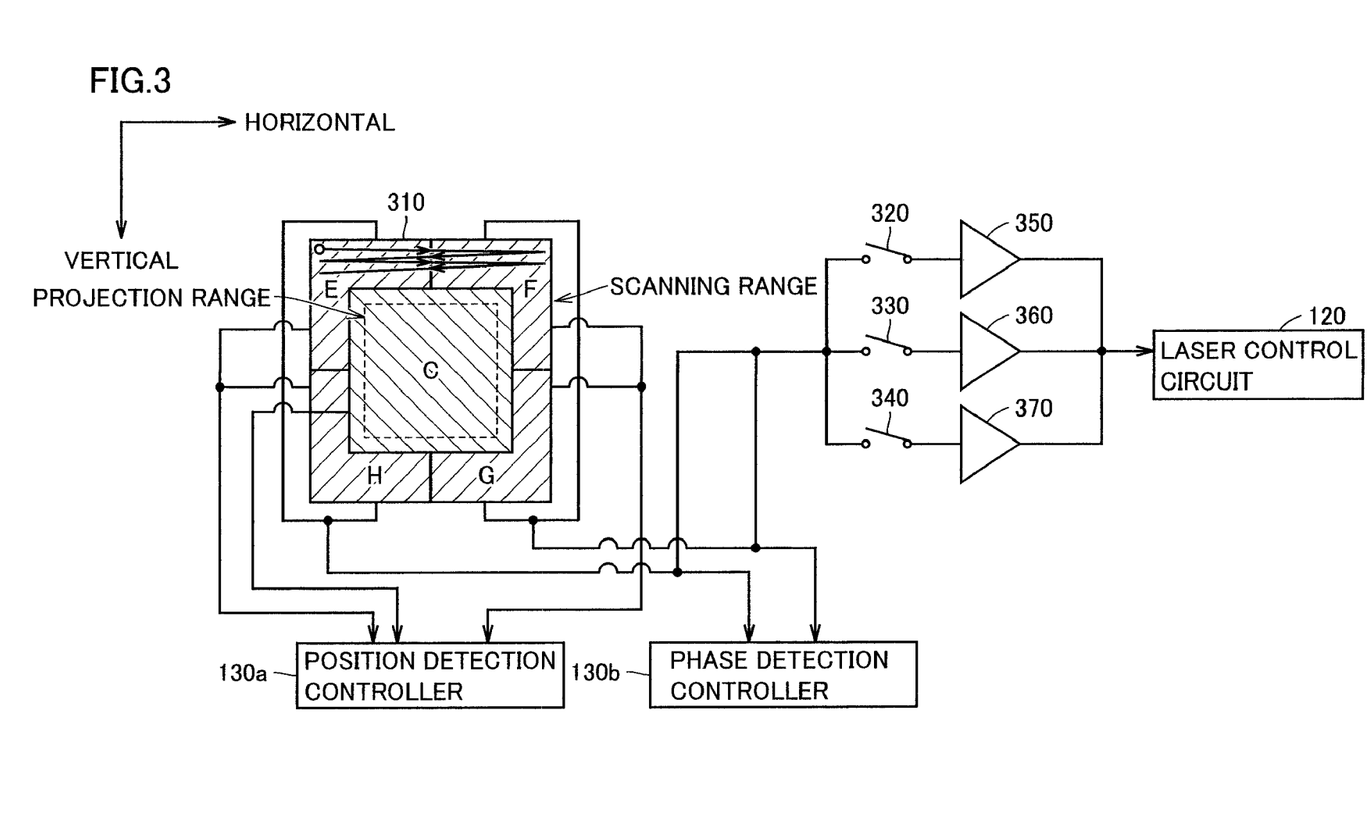
FIG. 3 is a view for illustrating a configuration of an optical detector.

A configuration of optical detector 117 of image display apparatus 100 in accordance with the present embodiment will be described with reference to FIG. 3. FIG. 3 is a view for illustrating a configuration of optical detector 117. It is to be noted that a right and left direction in FIG. 3 represents a horizontal direction of scanning, that is, a direction in which scanning is performed at a high frequency, and an up and down direction in FIG. 3 represents a vertical direction of scanning, that is, a direction in which scanning is performed at a low frequency.

A detection surface 310 of optical detector 117 is divided into a region C, a region E, a region F, a region G, and a region H. Optical detector 117 outputs detection signals corresponding to the amounts of light incident on the respective regions. That is, optical detector 117 outputs a plurality of (in this case, five) detection signals, independent of one another, corresponding to the respective regions.

Region C is a detection surface of the position detection unit. Region C is arranged in the vicinity of the center of detection surface 310 to cover a range in which a laser beam constituting an image to be displayed onto screen 170 is scanned (hereinafter referred to as an "image projection range"). That is, the position detection unit detects a laser beam incident on a region including therein the image projection range.

In the present embodiment, a region wider than the projection range by an error that may be caused by assembling the optical system or the like is defined as region C. By defining the detection surface of the position detection unit considering an error as described above, time and effort required for adjusting the position of scan mirror 115 after assembling image display apparatus 100 can be eliminated. The size of a region extended as an error can be determined, for example, by experimentally fabricating several kinds of apparatuses.

Regions E to H are respectively located around region C. Regions E to H are arranged to cover a scanning range, that is, a range in which the laser beam is incident when scan mirror 115 scans the laser beam with being moved with a maximum amplitude.

Region E and region F each include a region deviated from region C in a vertical up direction and a region deviated from region C in a horizontal direction. Region G and region H each include a region deviated from region C in a vertical down direction and a region deviated from region C in the horizontal direction. The regions deviated from region C in the vertical direction in regions E to G are used to detect the intensity of the laser beam. That is, these regions each serve as a detection surface of the power detection unit. The regions deviated from region C in the horizontal direction in regions E to G are used to detect the position of the laser beam. That is, these regions each serve as a detection surface of the position detection unit.

Position detection controller 130a receives a detection signal of the position detection unit. Position detection controller 130a detects the position of scan mirror 115 based on the received detection signal. Details of an operation of position detection controller 130a will be described later.

A detection signal of the power detection unit is divided into two. Phase detection controller 130b receives one of the divided detection signals. Phase detection controller 130b detects the phase of oscillation of scan mirror 115 based on the received detection signal. Details of an operation of phase detection controller 130b will be described later.

The other of the divided detection signals is transmitted toward laser control circuit 120, and is further divided into three. One of the divided signals is input to laser control circuit 120 via a switch 320 and a gain circuit 350. Another of the divided signals is input to laser control circuit 120 via a switch 330 and a gain circuit 360. The other of the divided signals is input to laser control circuit 120 via a switch 340 and a gain circuit 370.

Switch 320, switch 330, and switch 340 are opened and closed to pass a red beam intensity detection signal, a green beam intensity detection signal, and a blue beam intensity detection signal, respectively, at prescribed timing. Details of timings of opening and closing the respective switches will be described later.

Gain circuit 350, gain circuit 360, and gain circuit 370 amplify the intensities of the red beam, the blue beam, and the green beam, respectively, to correct a difference in detection efficiency due to wavelengths. That is, intensity amplification ratios (i.e., gains) of the respective gain circuits are determined to correct a difference in the detection efficiencies of the beams of the respective colors. Since laser control circuit 120 has such gain circuits, laser control circuit 120 can perform laser beam intensity correction without taking the difference in the detection efficiencies of the beams of the respective colors into consideration.

[3. Position Detection]

Position detection controller 130a determines a difference between a detection signal of region C and a detection signal of a peripheral region deviated from region C in the horizontal direction (portions of regions E to G). Position detection controller 130a calculates the position of scan mirror 115 based on timing at which the difference varies by a prescribed value or more. This process is equivalent to detecting timing at which the laser beam is incident on region C, more specifically, detecting timing at which the laser beam passes over a boundary between region C and the peripheral region.

In the present embodiment, position detection controller 130a calculates the position of scan mirror 115 based on the difference between the detection signal of region C and the detection signal of the peripheral region deviated from region C in the horizontal direction. However, position detection controller 130a may calculate the position based on only the detection signal of region C, or position detection controller 130a may calculate the position based on only the detection signal of the peripheral region deviated in the horizontal direction. If position detection controller 130a calculates the position based on only the detection signal of region C, the portions of regions E to G deviated from region C in the horizontal direction are unnecessary. However, the position can be calculated more accurately in a case where it is calculated based on a difference between two signals as in the present embodiment, than in a case where it is calculated based on one signal.

[4. Power Control]

Laser control circuit 120 adjusts the intensities of the laser beams emitted by green laser 111 and two-color laser 112 based on the laser beam intensity detection signals. Specifically, laser control circuit 120 adjusts drive currents supplied to the respective lasers to adjust the intensities of the laser beams.

Figure 4:
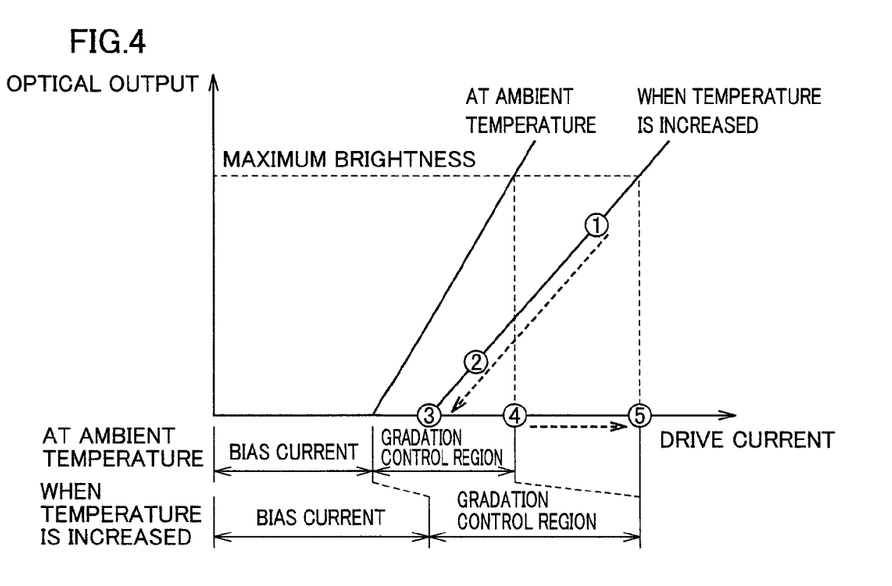
FIG. 4 is a view for illustrating an exemplary method of adjusting a drive current performed by a laser control circuit.

An exemplary method of adjusting a drive current performed by laser control circuit 120 will be described with reference to FIG. 4. FIG. 4 is a view for illustrating an exemplary method of adjusting a drive current performed by laser control circuit 120. For the sake of simplicity, a description will be given on the control of one laser.

In a graph shown in FIG. 4, the axis of abscissas represents a drive current supplied to a laser, and the axis of ordinates represents the intensity of a beam output by the laser (optical output). Generally, optical output has a characteristic that it is zero when the drive current is less than or equal to a certain value (referred to as a bias current value), and it increases with an increase in the drive current after the drive current exceeds the bias current value. The characteristic of the optical output relative to the drive current varies depending on the temperature at which the laser is placed. Specifically, as shown in FIG. 4, when the temperature is increased, the bias current value is increased, and the ratio of an increase in the optical output to an increase in the drive current varies.

Laser control circuit 120 corrects the bias current value based on a set of a value of a first drive current and a value of an optical output obtained when the first drive current is supplied to the laser (i.e., a point indicated by "1" in FIG. 4) and a set of a value of a second drive current that is different from the value of the first drive current and a value of an optical output obtained when the second drive current is supplied to the laser (i.e., a point indicated by "2" in FIG. 4). For example, laser control circuit 120 determines a value of a drive current at a point where a straight line passing the two sets of the drive currents and the optical outputs intersects with an axis indicating that the optical output is zero (i.e., a point indicated by "3" in FIG. 4), as the bias current value. However, this is merely one example, and laser control circuit 120 may determine the bias current value by other methods. For example, laser control circuit 120 may determine the increase characteristic of the optical output relative to the drive current based on more detection signals, and may determine the bias current value based on the determined increase characteristic.

Next, laser control circuit 120 determines an upper limit of a gradation control region, that is, a value of a drive current obtained when the output laser beam has a maximum intensity. For example, laser control circuit 120 determines a current value obtained when a power source for an APC (Automatic Power Control) circuit is turned on with a target value of a current intensity being set at a maximum value, as an upper limit of a gradation control region. In the example shown in FIG. 4, laser control circuit 120 corrects the upper limit of the gradation control region, from a value indicated by "4" to a value indicated by "5".

Figure 5:
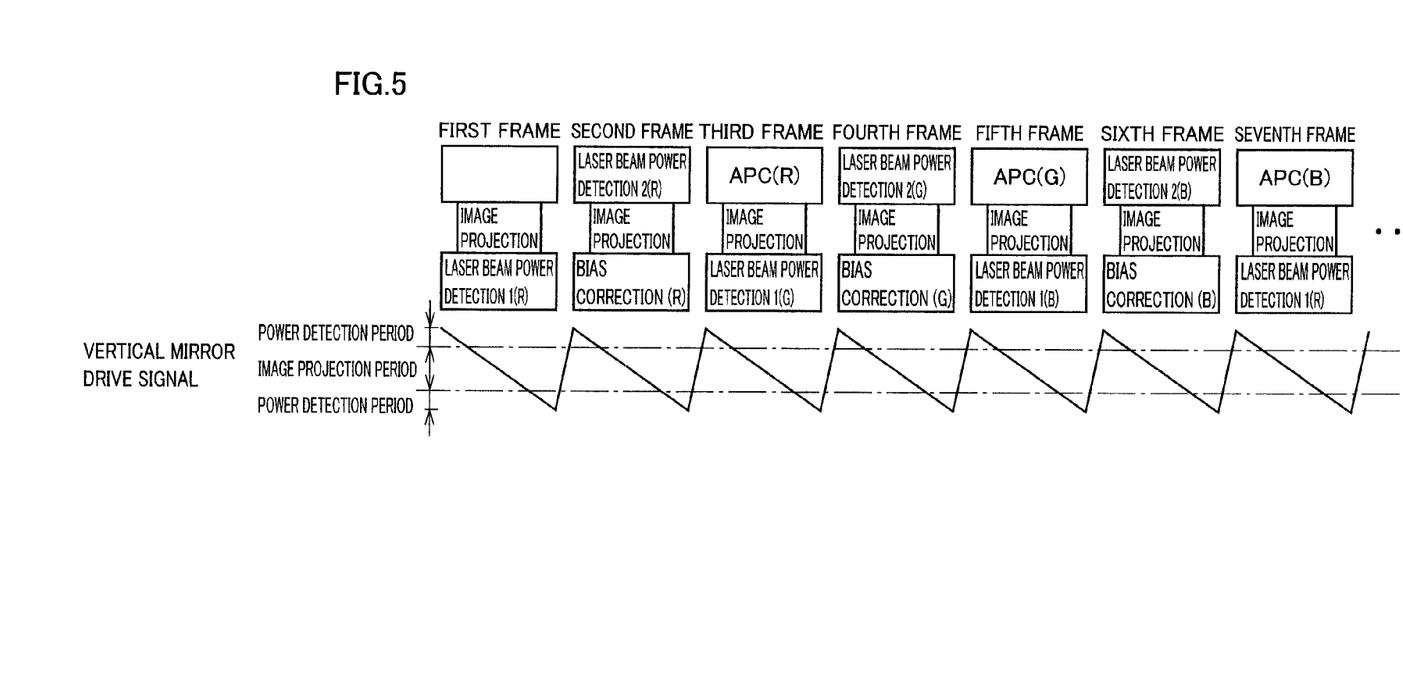
FIG. 5 is a view for illustrating timing of processes related to laser beam intensity correction.

Timing of processes related to laser beam intensity correction will be described with reference to FIG. 5. FIG. 5 is a view for illustrating timing of processes related to laser beam intensity correction.

The drawing in an upper portion of FIG. 5 schematically shows the relationship between time periods for which the beam is incident on detection surface 310 and processes performed by laser control circuit 120. In a graph in a lower portion of FIG. 5, the axis of abscissas represents time, and the axis of ordinates represents a laser beam applying position in a vertical direction designated by a mirror drive signal in the vertical direction. As shown in FIG. 5, during detection of the intensity of the laser beam, the mirror drive signal causes the position of the laser beam in the vertical direction to gradually move from top to bottom, and after the laser beam is moved to the lowest position, the mirror drive signal causes the laser beam to move to the highest position, and then repeats this cycle. Herein, when scanning is started, the position of the laser beam in the vertical direction is set at the highest position.

When a prescribed time has elapsed from a scanning start time point and an image projection period for a first frame is started, laser control circuit 120 causes green laser 111 and two-color laser 112 to emit laser beams corresponding to an image of the first frame.

When the image projection period for the first frame is finished, laser control circuit 120 sets a drive current to a first value, and causes two-color laser 112 to emit a red laser beam for detecting intensity. Further, laser control circuit 120 receives an output from optical detector 117 (an output from region G and region H in FIG. 3). At a time point when the laser beam is moved to the lowest position, laser control circuit 120 causes two-color laser 112 to stop emitting the red laser beam for detecting intensity.

Since the power detection unit is provided in the region deviated from the image projection range in the vertical direction in the present embodiment, sufficient sampling time can be secured. Therefore, less burden is imposed on hardware. There is no need to prepare optical detector 117 having a high time resolution.

At a time point when the laser beam is moved to the highest position, laser control circuit 120 sets the drive current to a second value, and causes two-color laser 112 to emit a red laser beam for detecting intensity. Further, laser control circuit 120 receives an output from optical detector 117 (an output from region E and region F in FIG. 3). Before an image projection period for a second frame is started, laser control circuit 120 causes two-color laser 112 to stop emitting the red laser beam for detecting intensity.

When the image projection period for the second frame is started, laser control circuit 120 causes green laser 111 and two-color laser 112 to emit laser beams corresponding to an image of the second frame. During this period, laser control circuit 120 calculates a correction value for the bias current value based on a detection result obtained by supplying the drive current having the first value to two-color laser 112 and a detection result obtained by supplying the drive current having the second value to two-color laser 112.

When the image projection period for the second frame is finished, laser control circuit 120 changes a value set for the bias current value of the red laser beam. Then, laser control circuit 120 turns on the power source for the APC circuit, and corrects the upper limit of the gradation control region. The example shown in FIG. 5 illustrates that laser control circuit 120 corrects the bias current value by the time point when the laser beam is moved to the lowest position, and turns on the power source for the APC circuit after the laser beam is moved to the highest position. However, it is satisfactory if laser control circuit 120 performs these two processes within a time period from when the image projection period for the second frame is finished to when an image projection period for a third frame is started.

Subsequently, laser control circuit 120 performs the same processes for a green laser beam and a blue laser beam. When laser control circuit 120 finishes the processes for the laser beams of all three colors, it performs intensity correction processes for the laser beams of the respective colors again. It is to be noted that the order of correcting the intensities of the laser beams of the respective colors is not limited to the one shown in FIG. 5.

The laser beam intensity correction processes shown in FIG. 5 are merely one example, and the processes performed by laser control circuit 120 are not limited thereto.

For example, laser control circuit 120 may operate as described below. Specifically, laser control circuit 120 measures the intensities of the laser beams of all three colors within a time period from when a projection period for an n-th frame is finished to when a projection period for an (n+1)-th frame is started. Laser control circuit 120 calculates a correction value for the bias current value during the projection period for the (n+1)-th frame. Laser control circuit 120 may correct bias current values for the laser beams of all three colors and correct the upper limit of the gradation control region within a time period from when the projection period for the (n+1)-th frame is finished to when a projection period for an (n+2)-th frame is started. With this technique, however, although laser beam intensity correction is performed more frequently, processes such as intensity measurement should be performed in a short period of time, resulting in an increased burden on hardware. In a case where intensity correction processes for the laser beams of the respective colors are performed at different timings as shown in FIG. 5, less burden is imposed on hardware. Further, since laser beam intensity generally does not vary significantly in a short period of time with changes in temperature, a reduction in correction frequency does not pose a big problem.

Furthermore, depending on the shape of the power detection unit, laser control circuit 120 should employ a different detection method. For example, if optical detector 117 having a power detection unit including a region combining region E and region H and a region combining region F and region G is used, laser control circuit 120 measures laser beam intensity as described below. Laser control circuit 120 measures laser beam intensity with the drive current having the first value within a time period from when the projection period for the n-th frame is finished to when the projection period for the (n+1)-th frame is started. Then, laser control circuit 120 measures laser beam intensity with the drive current having the second value within a time period from when the projection period for the (n+1)-th frame is finished to when the projection period for the (n+2)-th frame is started.

Optical detector 117 in accordance with the present embodiment has the power detection unit divided into the region deviated from the image projection range in the vertical up direction and the region deviated from the image projection range in the vertical down direction. Therefore, optical detector 117 can detect laser beam intensities relative to drive currents of two values within a time period from when projection for a frame is finished to when projection for a next frame is started, and can improve correction frequency.

[5. Phase Detection]

Figure 6:
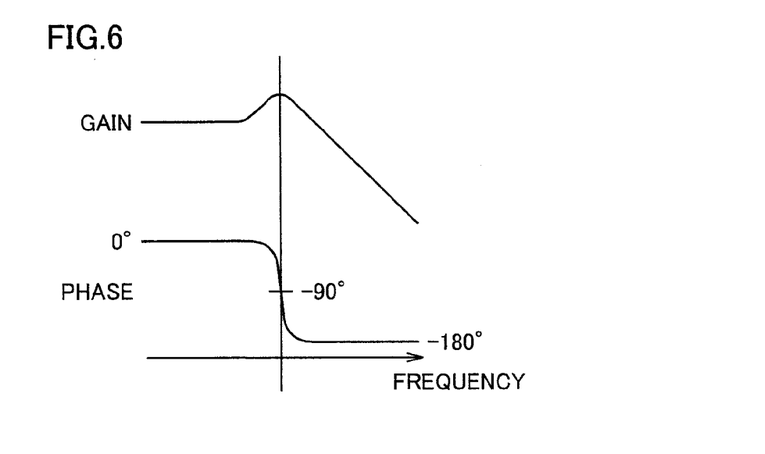
FIG. 6 is a view showing a frequency characteristic of a resonance scanning mirror.

In the present embodiment, scan mirror 115 is a resonance scanning mirror. A resonance scanning mirror has a frequency characteristic. Specifically, the amplitude of a resonance scanning mirror varies depending on the frequency of a drive signal supplied to the mirror. A frequency characteristic of a resonance scanning mirror is shown in FIG. 6. FIG. 6 is a view showing a frequency characteristic of a resonance scanning mirror.

In FIG. 6, the axis of abscissas represents frequency of oscillation. The axis of ordinates in an upper graph represents gain, that is, the amplitude of the resonance scanning mirror. The axis of ordinates in a lower graph represents a phase of oscillation relative to that of a drive signal. As can be seen from the upper graph, the resonance scanning mirror does not oscillate with a sufficient amplitude unless it is driven at a resonance point. It can also be seen that the phase of oscillation relative to that of the drive signal at the time of resonance is −90 degrees.

Phase detection controller 130b can detect a difference between a phase of oscillation of scan mirror 115 in the horizontal direction and a phase of the drive signal (referred to as a phase difference) based on a detection result on beam intensity detected by the power detection unit divided into two in the horizontal direction. Further, phase detection controller 130b transmits the detected phase difference to CPU 140. CPU 140 controls drive frequency controller 150 to achieve a phase difference of −90 degrees.

Figure 7:
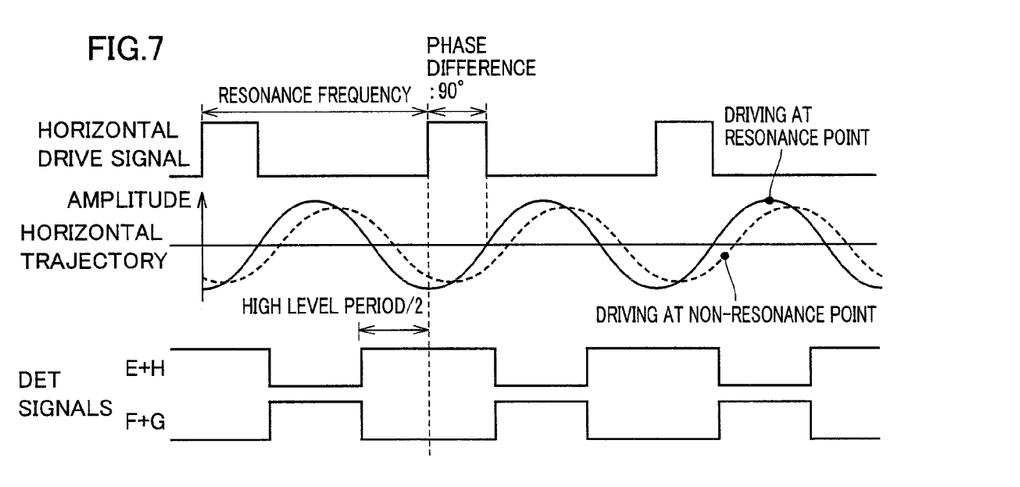
FIG. 7 is a view for illustrating the relationship between oscillation of the resonance scanning mirror and detection signals.

The principle of detection of a phase difference by phase detection controller 130b will be described with reference to FIG. 7. FIG. 7 is a view for illustrating the relationship between oscillation of the resonance scanning mirror and detection signals. In each graph shown in FIG. 7, the axis of abscissas represents time.

The uppermost graph in FIG. 7 indicates timing of a horizontal drive signal. The axis of ordinates represents the magnitude of the signal. As shown in the drawing, the horizontal drive signal is a pulse signal generated at a prescribed time interval.

The middle graph in FIG. 7 indicates an oscillation state of the resonance scanning mirror. The axis of ordinates represents a scanning position in the horizontal direction. In a case where XY driver 160 supplies a drive signal having a resonance frequency to the mirror (i.e., in the case of driving at a resonance point), the mirror oscillates with a phase 90 degrees delayed from that of the drive signal. Therefore, the mirror has a maximum amplitude at a time point when the drive signal starts rising. On the other hand, in a case where the drive signal supplied by XY driver 160 to the mirror does not have a resonance frequency (i.e., in the case of driving at a non-resonance point), the phase difference between the phase of oscillation of the mirror and the phase of the drive signal is not −90 degrees, and thus a time point when the mirror has a maximum amplitude does not match the time point when the drive signal starts rising.

The lowermost two graphs in FIG. 7 indicate the sum of a detection signal of region E and a detection signal of region H (signals E+H) in the case of driving at the resonance point and the sum of a detection signal of region F and a detection signal of region G (signals F+G) in the case of driving at the resonance point, respectively. The axis of ordinates of the graphs represents the magnitude of the detection signals.

In the case of driving at the resonance point, a central time point of a period for which signals E+H are at a high level or a period for which signals F+G are at a low level matches the time point when the drive signal starts rising, as is obvious from the state of oscillation in the case of driving at the resonance point. Conversely, in the case of driving at the non-resonance point, the central time point of these periods does not match the time point when the drive signal starts rising.

Based on this characteristic, phase detection controller 130b determines the phase difference, from the relationship between the time point when the drive signal starts rising and the central time point of a signal detection period or a signal non-detection period.

CPU 140 changes a drive signal frequency output by the drive frequency controller in a direction in which the phase difference is eliminated, according to whether the phase difference has a positive or negative value.

As described above, in the present embodiment, a detection surface of one detector is divided into a plurality of regions, and signals from the respective regions are processed by software, and thereby the one detector can perform detection of the intensity of a laser beam, detection of an image projection position, and detection of a phase of oscillation of a resonance scanning mirror. Therefore, intensity detection, position detection, and the like can be implemented without increasing detectors, and the number of parts of a projector can be significantly reduced.

(6. Flow of Processes)

Figure 8:
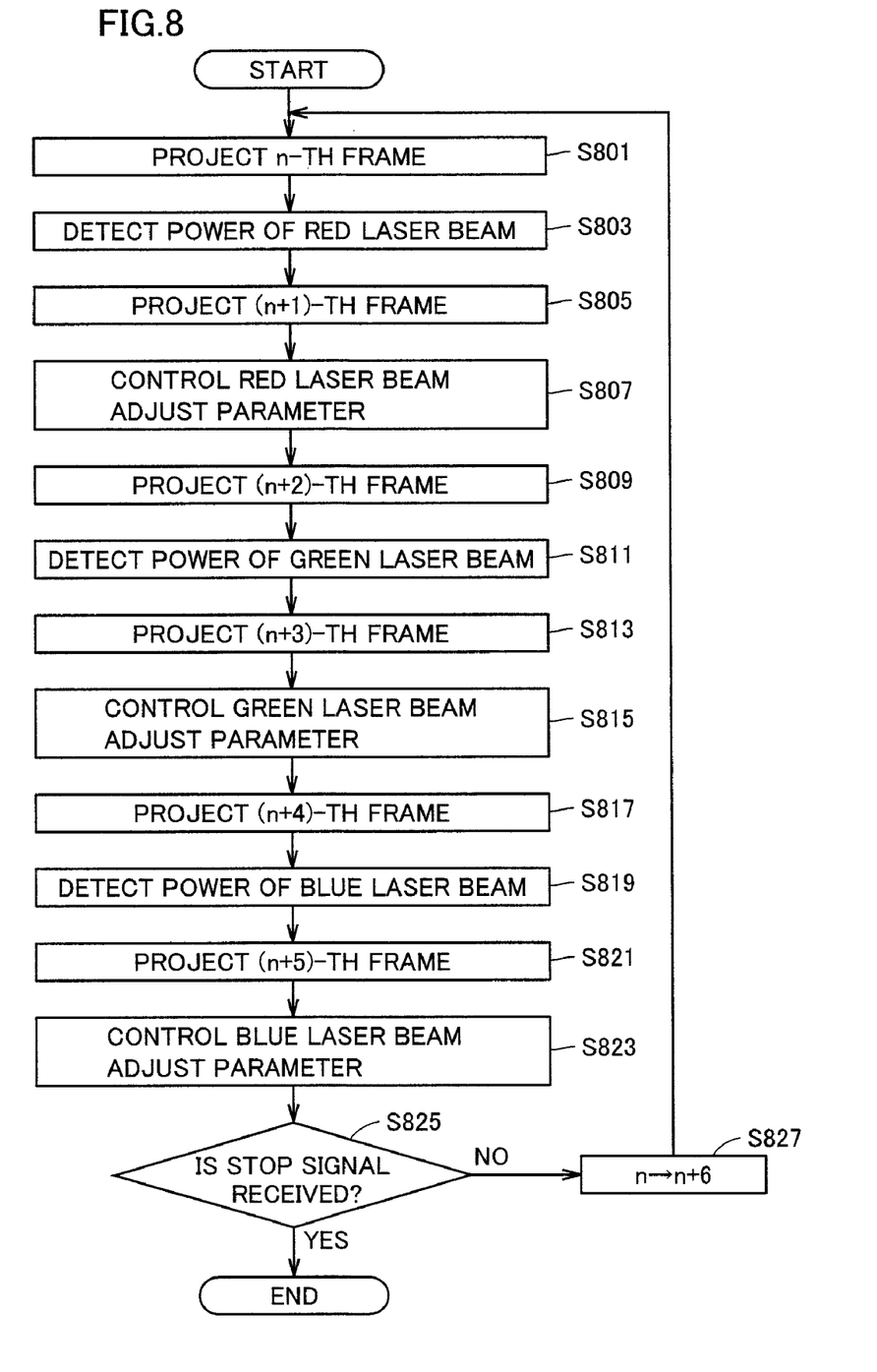
FIG. 8 is a flowchart showing a flow of processes performed by the laser control circuit.

Finally, a flow of processes performed by laser control circuit 120 for controlling laser beam intensity will be summarized with reference to FIG. 8.

In step S801, laser control circuit 120 causes green laser 111 and two-color laser 112 to emit laser beams corresponding to an n-th frame of an image to be displayed.

In step S803, at a time point when a laser beam is incident on the detection surface of the power detection unit, laser control circuit 120 controls two-color laser 112 to emit a red laser beam for detecting power. Further, laser control circuit 120 receives a detection result on the intensity of the laser beam from the power detection unit.

In step S805, laser control circuit 120 causes green laser 111 and two-color laser 112 to emit laser beams corresponding to an (n+1)-th frame of the image to be displayed.

In step S807, laser control circuit 120 adjusts a control parameter of the red laser beam based on the detection result on the intensity of the red laser beam received in step S803. To reduce total processing time, it is preferable that laser control circuit 120 performs this process while the (n+1)-th frame is being projected.

In step S809, laser control circuit 120 causes green laser 111 and two-color laser 112 to emit laser beams corresponding to an (n+2)-th frame of the image to be displayed.

In step S811, at a time point when a laser beam is incident on the detection surface of the power detection unit, laser control circuit 120 controls green laser 111 to emit a green laser beam for detecting power. Further, laser control circuit 120 receives a detection result on the intensity of the laser beam from the power detection unit.

In step S813, laser control circuit 120 causes green laser 111 and two-color laser 112 to emit laser beams corresponding to an (n+3)-th frame of the image to be displayed.

In step S815, laser control circuit 120 adjusts a control parameter of the green laser beam based on the detection result on the intensity of the green laser beam received in step S811. To reduce total processing time, it is preferable that laser control circuit 120 performs this process while the (n+3)-th frame is being projected.

In step S817, laser control circuit 120 causes green laser 111 and two-color laser 112 to emit laser beams corresponding to an (n+4)-th frame of the image to be displayed.

In step S819, at a time point when a laser beam is incident on the detection surface of the power detection unit, laser control circuit 120 controls two-color laser 112 to emit a blue laser beam for detecting power. Further, laser control circuit 120 receives a detection result on the intensity of the laser beam from the power detection unit.

In step S821, laser control circuit 120 causes green laser 111 and two-color laser 112 to emit laser beams corresponding to an (n+5)-th frame of the image to be displayed.

In step S823, laser control circuit 120 adjusts a control parameter of the blue laser beam based on the detection result on the intensity of the blue laser beam received in step S819.

To reduce total processing time, it is preferable that laser control circuit 120 performs this process while the (n+5)-th frame is being projected.

In step S825, laser control circuit 120 determines whether or not it receives an input of a stop signal indicating to stop displaying the image.

When laser control circuit 120 receives an input of the stop signal (YES in step S825), laser control circuit 120 finishes the processes.

When laser control circuit 120 does not receive an input of the stop signal (NO in step S825), laser control circuit 120 adds 6 to n in step S827. Then, laser control circuit 120 repeats the processes from step S801 onward.

It is to be noted that the processes shown in FIG. 8 are merely one example, and the order of the processes performed by laser control circuit 120 is not limited to the one shown in FIG. 8. For example, the order of processes for controlling the intensities of the laser beams of the respective colors may be changed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display apparatus for displaying an image on a projection surface by applying a laser beam onto said projection surface, comprising:
   a laser light source configured to emit said laser beam in accordance with a drive current;
   a scanning device configured to conduct a laser beam scan by applying said laser beam to a prescribed range on said projection surface, said scanning device applying said laser beam selectively for each pixel of said image in a prescribed cycle;
   a beam splitting element configured to split incident said laser beam into a first laser beam directed toward said projection surface and a second laser beam directed toward a direction different from a direction toward said projection surface;
   a detector having a detection surface configured to detect reflected said laser beam, said detection surface including a first detection region including a region in which said second laser beam is scanned as said first laser beam is scanned in a projection range of said image, and a second detection region arranged around said first detection region and on which said second laser beam is incident at prescribed timing by scanning of said laser beam by said scanning device;
   a position detector configured to detect a position of said scanning device based on timing at which said laser light source is driven and timing at which said laser beam is incident on said first detection region; and
   a laser control unit configured to adjust timing of emission of said laser beam based on the position of said scanning device and adjusting an intensity of said laser beam emitted by said laser light source based on an intensity of said laser beam detected in said second detection region.

2. The image display apparatus according to claim 1, wherein said first detection region is wider than said projection range by a range corresponding to an assembly error for said image display apparatus.

3. The image display apparatus according to claim 1, wherein
   said scanning device conducts said laser beam scan at a first frequency in a first direction, and conducts said laser beam scan at a second frequency lower than said first frequency in a second direction orthogonal to said first direction, and
   said detector detects an intensity of said laser beam incident on a region deviated from said first detection region in said second direction.

4. The image display apparatus according to claim 3, wherein
   said second detection region includes two intensity detection regions arranged at different positions in said second direction, and
   said laser control unit controls said laser light source to allow said laser beam with a different intensity to be incident on each of said intensity detection regions, determines a characteristic of the intensity of said laser beam emitted by said laser light source relative to said drive current based on a detection result on the intensity of said laser beam incident on each of said intensity detection regions, and adjusts the intensity of said laser beam emitted by said laser light source based on said characteristic.

5. The image display apparatus according to claim 1, wherein
   said laser light source emits a plurality of laser beams having colors different from one another, and
   said laser control unit causes said laser light source to emit said laser beam having one of the colors in each period in which said laser beam is detected in said second detection region.

6. The image display apparatus according to claim 5, further comprising an amplifier configured to amplify a detection result on said laser beam of each color in said second detection region in accordance with detection sensitivity for said laser beam of each color, and outputting a signal to said laser control unit.

7. The image display apparatus according to claim 5, wherein said laser light source includes a two-color laser for emitting a red laser beam and a blue laser beam, and a green laser for emitting a green laser beam.

8. The image display apparatus according to claim 1, wherein
   said scanning device is a resonance scanning mirror oscillating in accordance with a drive signal,
   said image display apparatus further comprises a driver for supplying said drive signal to said resonance scanning mirror,
   said second detection region is divided into two phase detection regions having a central axis of a scanning range of said laser beam as a boundary line, and
   said image display apparatus further comprises a phase detection unit configured to detect a phase difference between a phase of oscillation of said resonance scanning mirror and a phase of said drive signal based on a period for which said laser beam is incident on each of said phase detection regions and timing at which said driver supplies said drive signal to said resonance scanning mirror.

9. An image display method for displaying an image on a projection surface by applying a laser beam from a laser light source onto said projection surface, said laser beam being split into a first laser beam directed toward said projection surface and a second laser beam directed toward a direction different from a direction toward said projection surface, said method comprising the steps of:
   detecting a scanning position of said laser beam based on: timing at which said laser beam is incident on a first detection region, the first detection region including a region in which said second laser beam is scanned as said first laser beam applied selectively for each pixel of said image toward said projection surface is scanned in a projection range of said image, and timing at which said laser light source emits said laser beam;

detecting an intensity of said laser beam incident on a second detection region arranged around said first detection region;

adjusting timing of emission of said laser beam based on said scanning position; and adjusting an intensity of said laser beam emitted by said laser light source based on the intensity of said laser beam incident on said second detection region.

10. The image display apparatus according to claim 1, wherein the first detection region is wider than the projection range and the second region includes at least two divided regions.

11. The image display apparatus according to claim 1, wherein regions within the second region deviated from the first detection region in a horizontal direction are configured to detect a position of the laser beam.

12. The image display apparatus according to claim 1, further comprising a processing unit configured to adjust a frequency of a drive signal supplied to the scanning device so as to eliminate a phase difference between a phase of oscillation of the scanning device and a phase of the drive signal based on whether the phase difference has a positive or negative value.

13. The image display method according to claim 9, wherein said laser light source emits a plurality of laser beams having colors different from one another, and said laser light source emits said laser beam having one of the colors in each period in which said laser beam is incident on said second detection region.

14. The image display method according to claim 9, wherein the first detection region is wider than the projection range and the second region includes at least two divided regions.

15. The image display method according to claim 9, wherein regions within the second region deviated from the first detection region in a horizontal direction are configured to detect a position of the laser beam.

16. The image display method according to claim 9, further comprising adjusting a frequency of a drive signal supplied to a scanning device so as to eliminate a phase difference between a phase of oscillation of the scanning device and a phase of the drive signal based on whether the phase difference has a positive or negative value.

* * * * *